United States Patent [19]

Kim

[11] 4,152,721
[45] May 1, 1979

[54] SATURATION CONTROL SYSTEM

[75] Inventor: Seung K. Kim, Portsmouth, Va.

[73] Assignee: General Electric Company, Portsmouth, Va.

[21] Appl. No.: 827,138

[22] Filed: Aug. 24, 1977

[51] Int. Cl.² ............................................ H04N 9/535
[52] U.S. Cl. ......................................... 358/27; 358/10
[58] Field of Search ..................................... 358/10, 27

[56] References Cited
U.S. PATENT DOCUMENTS

| | | | |
|---|---|---|---|
| 3,673,320 | 6/1972 | Carnt et al. ............................. | 358/10 |
| 3,950,780 | 4/1976 | Freestone ............................... | 358/28 |
| 4,059,838 | 11/1977 | Banker et al. .......................... | 358/27 |

Primary Examiner—Robert L. Griffin
Assistant Examiner—Joseph A. Orsino, Jr.

[57] ABSTRACT

An automatic saturation control system for a color television receiver using color information extracted from a vertical interval reference (VIR) signal to establish the saturation setting of the receiver. The saturation setting is governed by the ratio of an AC coupled luminance signal and one AC coupled color difference signal during a single interrogation of the VIR signal.

7 Claims, 5 Drawing Figures

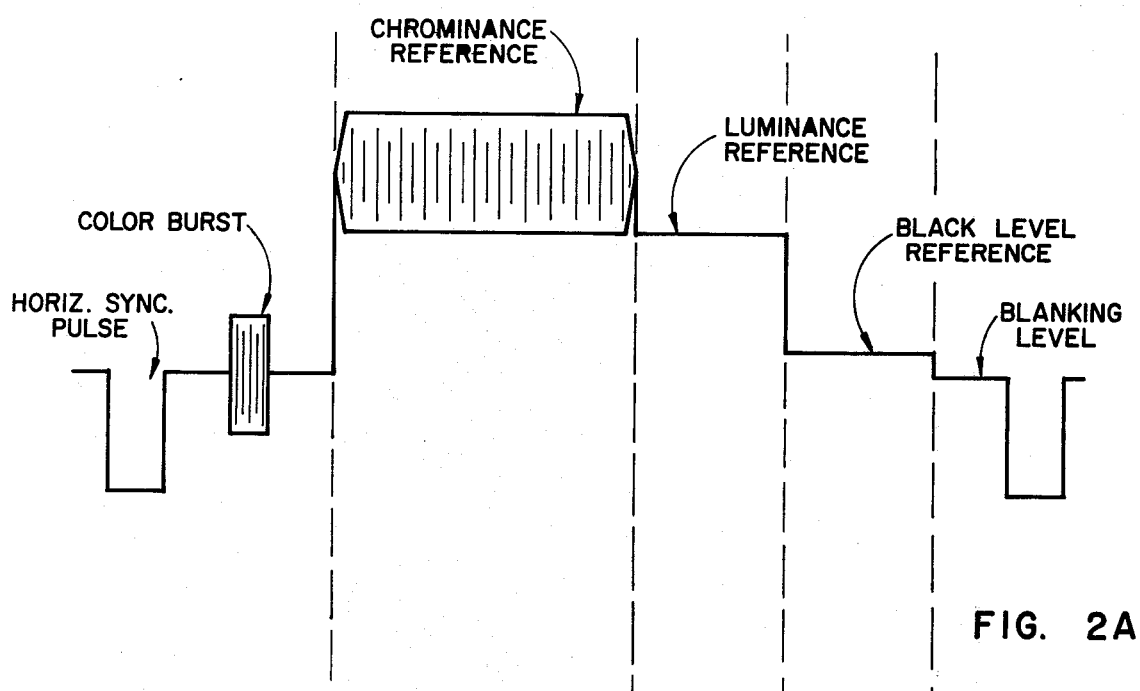
FIG. 2A
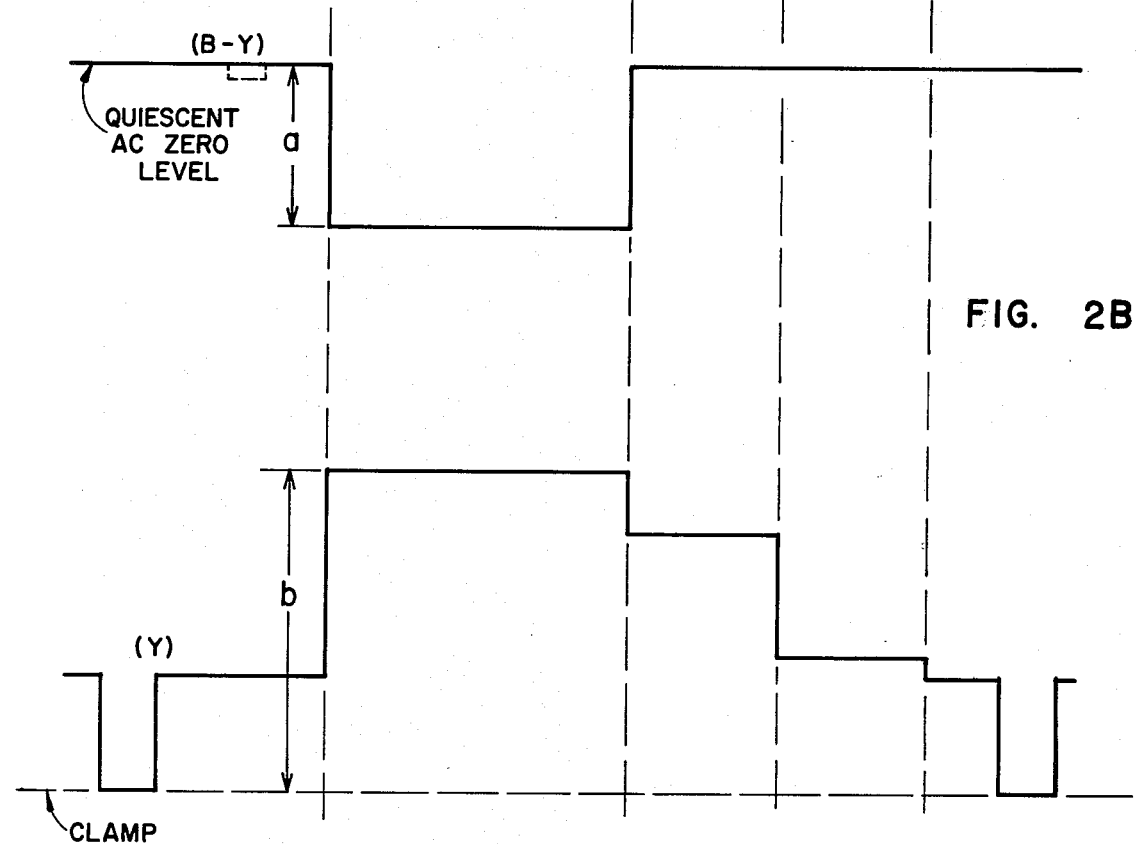
FIG. 2B
FIG. 2C

SATURATION CONTROL SYSTEM

BACKGROUND OF THE INVENTION

The present invention relates to automatic saturation control circuitry for a color television receiver in which a vertical interval reference (VIR) signal containing unique saturation information is relied upon for automatically establishing saturation correction in a displayed image.

Video information transmitted to a television receiver comprises a luminance signal portion and a chrominance signal portion. Demodulation of the chrominance signal produces color difference signals which are applied to a matrix amplifier where they are combined with the luminance signals to produce red, green, and blue color signals for application to a color picture tube.

The ratio of the chrominance signal, from which the red, green, and blue color signals for the picture tube are derived, to the luminance signal used to derive these color signals, determines the saturation or chroma gain of the receiver. As the ratio increases, the resulting picture is more saturated and as the ratio decreases the resulting picture is less saturated.

The present invention relates to control circuits of the general type set forth in U.S. Pat. No. 3,950,780 issued to Harry T. Freestone and assigned to the assignee of the present invention, in which the saturation of the television receiver is set in accordance with color information contained in the VIR signal.

The Freestone patent relies on the proposition that when the phase of the chrominance reference portion of the VIR signal is the phase of one color difference signal then the other color difference color signal in quadrature therewith is zero. Thus, if the phase of the chrominance reference portion is $-(B-Y)$, then the $R-Y$ color difference signal detector output should be at a null. This unique characteristic permits the use of a feedback control circuit to set the hue of the receiver by automatically adjusting the tint control until the $R-Y$ output of the color difference detector is at a null.

In addition, the Freestone patent relies on the proposition that the fixed relationship of the amplitude of the chrominance signal during the chrominance reference portion of the VIR signal to the amplitude of the luminance signal enables the receiver processing circuitry to be adjusted so that the matrixing of the $-(B-Y)$ chrominance signal with the Y luminance signal will provide a null, i.e., the matrix amplifier should have the same blue signal output level during the chrominance reference portion of the VIR signal that it has during black level transmission. This unique characteristic permits use of a feedback circuit to set the saturation of the receiver by automatically adjusting the relative magnitudes of the luminance and chrominance signals until the blue signal output of the matrix amplifier is at a null.

Employing this latter proposition, the Freestone patent utilizes a control loop to compare the blue signal output derived from the chrominance reference portion of the VIR signal to a black level reference signal and to adjust the saturation setting of the receiver until any difference between the two signals is zero. In a preferred embodiment, Freestone employs double interrogation of the VIR signal, once during the chrominance reference portion to obtain the blue signal and once during the black level portion to obtain the black level reference.

The present invention utilizes a different approach to that adopted by Freestone. The present invention utilizes single interrogation of the VIR signal and AC coupling of both the luminance and chrominance signals during the chrominance reference portion of the VIR signal to a matrix where the AC variations are compared to establish the control signal for setting the saturation of the receiver. Thus, no direct attempt is made to establish the null of the blue color signal. Instead, the AC variations in the luminance signal and the $B-Y$ color difference signal are compared during VIR chrominance reference time to establish saturation control.

It is accordingly an object of the present invention to provide an automatic saturation control circuit for a color television receiver.

Another object of the present invention is to provide automatic saturation control in a color television receiver wherein single interrogation of the VIR signal is realized.

By use of a black level reference, such as obtained in a preferred embodiment by double interrogation of the VIR signal, Freestone is able to set saturation of the receiver without being subject to drift due to power supply shift or component heating or aging. Each occasion of the VIR signal provides updating of both the chrominance reference information and the black level reference so that the control loop is insensitive to drift. The control system of the present invention is also insensitive to drift by the utilization of AC coupling to compare only AC variations of the $B-Y$ and Y signals during VIR chrominance reference time.

It is accordingly another object of the present invention to provide automatic saturation control in a color television receiver that is essentially insensitive to drift problems.

SUMMARY OF THE INVENTION

These and other objects are generally realized in the automatic saturation control system of the present invention which is employed in conjunction with a color television receiver having a matrix amplifier responsive to color difference signals in the chrominance signal portion of a received video signal and a luminance signal in a received video signal to provide color signals for the color picture tube of the television receiver.

In accordance with the present invention, the luminance signal and a select one of the color difference signals are both AC coupled in a closed loop video control circuit which provides an error signal responsive to the relative AC magnitudes of the luminance signal and the select color difference signal during a single interrogation of the chrominance reference portion of the VIR signal. The closed loop video control circuit includes a saturation control circuit responsive to the error signal to continuously adjust the ratio of the chrominance signal to the luminance signal in the television receiver such that the AC coupled luminance and AC coupled select one color difference signals conform to a preselected ratio to one another during the single interrogation of the VIR signal.

In a preferred embodiment of the invention, the closed loop video control circuit includes a gating circuit controlled by a single timing pulse to establish the single interrogation of the VIR signal. In addition, a first amplifier is provided in the closed loop control circuit to generate a first current responsive to the AC coupled color difference signal and a second amplifier is provided for generating a second current responsive to the AC coupled luminance signal. In this embodiment, a matrix amplifier generates the error signal proportional to variances between the first and second currents.

In another preferred embodiment of the present invention, the closed loop video control circuit further includes a preference control circuit for adjusting the level of at least one of the AC coupled luminance and AC coupled select color difference signals such that the error signal results in a shift in the comparative magnitudes of the luminance and chrominance signals to maintain the relative magnitudes of the adjusted AC coupled signals in accordance with the preselected ratio, thereby causing a saturation shift in the color picture of the television receiver.

BRIEF DESCRIPTIONS OF THE DRAWINGS

The accompanying drawings, which are incorporated in and constitute a part of this specification, illustrate a preferred embodiment of the present invention and together with the description serve to explain the principles of the invention.

FIG. 2A is a representation of the waveform of a VIR signal;

FIG. 2B is a representation of the waveform of a VIR B−Y color difference signal;

FIG. 2C is a representation of the waveform of a VIR luminance signal; and

DESCRIPTION OF THE PREFERRED EMBODIMENT

Reference will now be made in detail to the present preferred embodiment of the invention, an example of which is illustrated in the accompanying drawings.

Figure 1:
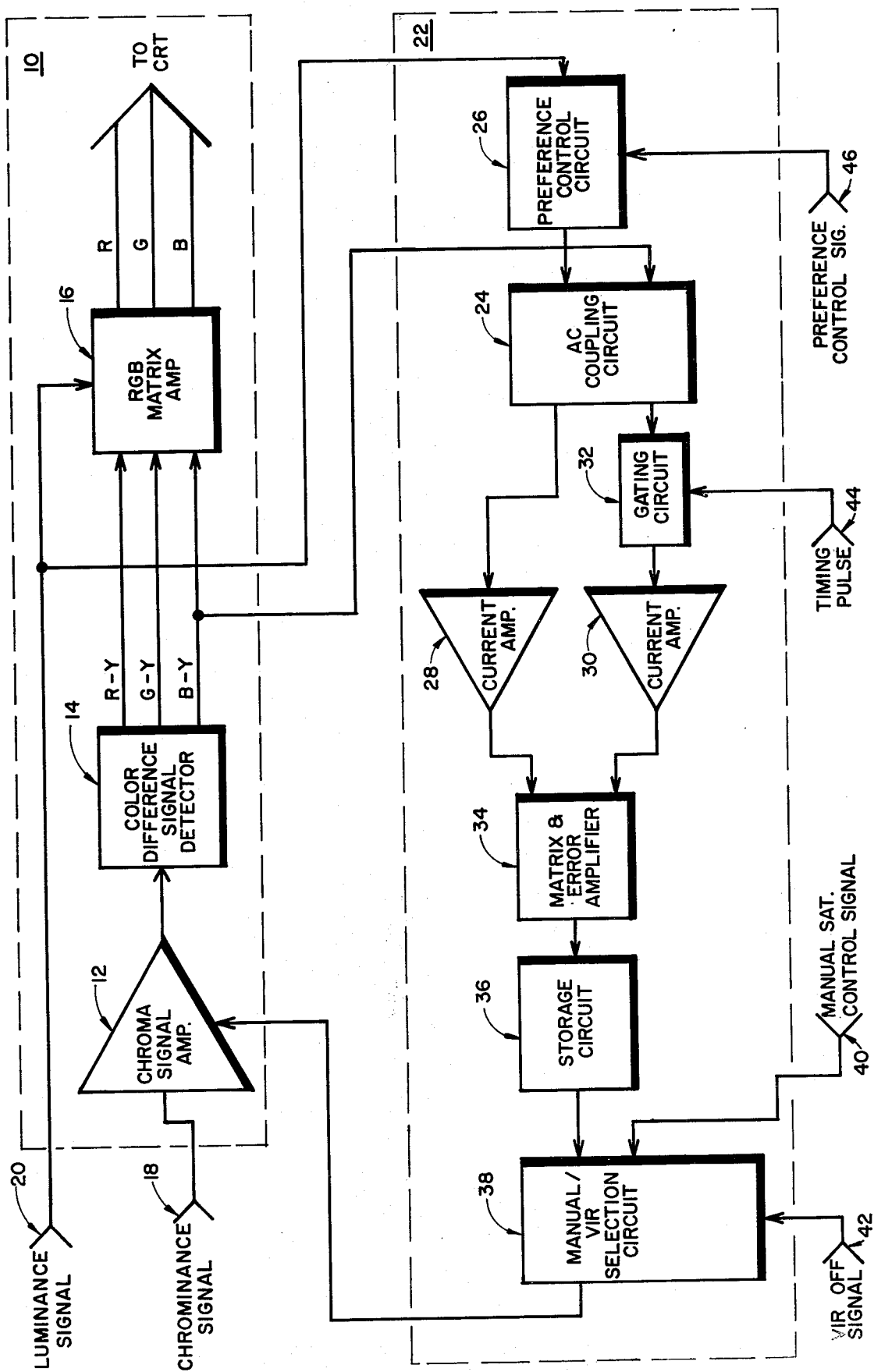
FIG. 1 is a block diagram of a portion of a color television receiver incorporating an automatic saturation control circuit in accordance with the preferred embodiment of the present invention.

Referring to FIG. 1 a portion of a chrominance signal processing section of a color television receiver is indicated generally by numeral 10. Chrominance signal processing section 10 includes a chrominance signal amplifier 12, color difference signal detector 14 and RGB matrix amplifier 16. A chrominance signal appearing at terminal 18 is amplified by chrominance signal amplifier 12 and delivered to color difference detector 14 which provides color difference signals B−Y, G−Y and R−Y to RGB matrix amplifier 16 in response to the chrominance signal and to a reconstituted subcarrier received from a subcarrier oscillator circuit, not shown.

The outputs of the color difference signal detector 14 and a luminance signal from terminal 20 are applied to RGB matrix amplifier 16 to provide an output of red (R), green (G), and blue (B) color signals. These red, green and blue color signals are then applied to a cathode ray tube (CRT) which is not shown. In some color television designs, RGB matrix amplifier 16 may, in fact, comprise the cathode ray tube of the receiver.

As is well known to those skilled in the art, a change in the ratio between the luminance signal appearing at terminal 20 and the amplified chrominance signal applied to color difference signal detector 14 is a means by which the saturation or chroma gain of the receiver is adjusted. In manual control circuits, the viewer adjusted degree of amplification provided by chrominance signal amplifier 12 governs the magnitude of the chrominance signal applied to color difference signal detector 14 in relationship to the magnitude of the luminance signal and thereby controls the saturation or chroma gain of the receiver. As the ratio is increased by the viewer, the resultant picture is more saturated and as the ratio is decreased by the viewer, the resulting picture is less saturated.

In accordance with the present invention, electronic control of the saturation of the receiver is achieved by a control circuit which comprises a closed loop video control circuit 22 coupled to the luminance signal from terminal 20 and coupled to a select one of the color difference signals generated by color difference signal detector 14. Closed loop control circuit 22 is responsive to the luminance signal and select color difference signal during a single interrogation of the chrominance reference portion of the VIR signal to provide an error signal which controls the amplification of chroma signal amplifier 12 and thereby automatically controls the saturation or chroma gain of the television receiver.

In the preferred embodiment of the present invention illustrated in FIG. 1, closed loop control video circuit 22 comprises AC coupling circuit 24, preference control circuit 26, first and second current amplifiers 28 and 30, gating circuit 32, matrix and error amplifier 34, storage circuit 36 and manual/VIR selection circuit 38.

In accordance with the present invention, a sample of a select one color difference signal, namely the B−Y color difference signal, from color difference signal detector 14 to RGB matrix amplifier 16 is AC coupled in control loop 22 by AC coupling circuit 24. A sample of the luminance signal from terminal 20 to RGB matrix amplifier 16 is also AC coupled in control loop 22 by AC coupling circuit 24. Preference control circuit 26 is illustrated in series combination between the luminance signal terminal 20 and AC coupling circuit 24 although it is to be understood that preference control circuit 26 may, in the alternative, be positioned in the series combination between the B−Y output of color difference signal detector 14 and AC coupling circuit 24 to operate on the B−Y color difference signal.

It is further to be understood that the present invention envisions use of any color difference signal depending upon the unique information contained in the VIR signal and which results in providing suitable color saturation information. The B−Y color difference signal does provide such suitable color saturation information in that during the chrominance reference portion of the VIR signal which is at −(B−Y) phase, the magnitude of this signal is set by FCC standards to be in fixed, preselected ratio to the magnitude of the luminance signal. As a consequence the resultant blue color signal can be set to a null during the chrominance reference portion of the VIR signal and prior art circuits employ the VIR signal to establish this null of the blue color signal, as previously stated.

However, in accordance with the teachings of the present invention, no direct attempt is made to establish the null of the blue color signal. Instead, AC variations in an AC coupled luminance signal and AC coupled B−Y color difference signal are compared to establish an error signal indicative of the ratio of the chrominance to luminance signals in the receiver.

It is a function of AC coupling circuit 24 to remove the DC bias from luminance signal Y and color difference signal B−Y and couple only the AC content of these signals in control loop 22. AC coupling circuit 24 may, for example, in its simplest form comprise a capacitor which eliminates DC bias from the output of color difference signal detector 14 and luminance signal Y and allows only the AC content of these signals to pass. The time constant of AC coupling circuit 24 must be large enough to pass a suitably accurate representation of the AC content of the luminance and B−Y color difference signals to enable subsequent matrixing of these signals as discussed below which results in a generation of the error signal to control the saturation gain of the receiver. Specific components comprising one such suitable AC coupling circuit are described below in connection with FIG. 3.

The AC coupled luminance signal is communicated from AC coupling circuit 24 through first current amplifier 28 to matrix and error amplifier 34. In a similar manner, the AC coupled B−Y signal is communicated from AC coupling circuit 24 through the series combination of gating circuit 32 and second current amplifier 30 to matrix and error amplifier 34. Matrix and error amplifier 34 comprises means for generating and amplifying an error signal responsive to the first and second current outputs from current amplifiers 28 and 30. The error signal from this matrix amplifier is continuously applied to and stored in storage circuit 36. The stored error signal in storage circuit 36 is fed back in closed loop fashion to chrominance signal amplifier 12 by manual/VR selection circuit 38 to continuously adjust the comparative magnitudes of the chrominance signal delivered to color difference signal detector 14 and the luminance signal delivered to RGB matrix amplifier 16.

Manual/VR selection circuit 38 allows the control loop to operate during receipt of the video wave which includes a VIR signal and allows for manual saturation control during receipt of a video wave which does not include a VIR signal or during receipt of a VIR signal at the option of the viewer. Simply put, a VIR OFF signal at terminal 42 of selection circuit 38 allows a manual hue control signal at terminal 40 of selection circuit 38 to adjust the gain of chrominance signal amplifier 12. Absence of a VIR OFF signal at terminal 42 of manual/VIR selector circuit 38 allows the stored VIR error signal from storage circuit 36 to adjust the gain of chrominance signal amplifier 12.

In operation of the present invention illustrated in FIG. 1, the ratio of the chrominance signal from chrominance amplifier 12 and the luminance signal at terminal 20 establishes the chrominance to luminance matrix ratio of the receiver. When no VIR signal is present, a VIR OFF signal appears at terminal 42 of manual/VIR selection circuit 38 disabling control loop 22 and allowing the manual saturation control signal appearing at terminal 40 of manual VIR selection circuit 38 to control the gain of chrominance signal amplifier 12. Should a viewer desire greater color saturation, for example, the saturation control signal at terminal 40 is manually adjusted to increase the gain of amplifier 12 which in turn increases the chrominance to luminance matrix ratio of the receiver. The setting of manual saturation control signal 40 is by manual operation of the viewer and without aid of a VIR signal.

In a video waveform having a VIR signal, as illustrated in FIG. 2A, the chrominance reference portion of the VIR signal passes through the chrominance signal amplifier 12 and is demodulated by color difference detector 14 to provide a B−Y color difference signal basically as illustrated in FIG. 2B. The B−Y color difference signal illustrated in FIG. 2B is then AC coupled in control loop 22 by AC coupling circuit 24. As illustrated by the dotted lines in FIG. 2B, a small B−Y color difference signal may appear during the color burst portion of the VIR signal. However, this is of no consequence because AC coupling circuit 24 has a time constant of long enough duration so that the burst signal does not disturb the AC quiescent condition of zero value immediately prior to the chrominance reference portion and only the AC change in the B−Y signal from the quiescent AC zero level is introduced by AC coupling circuit 24.

In a similar manner a sample of the VIR luminance signal illustrated in FIG. 2C is AC coupled in control loop 22 by AC coupling circuit 24. Since the luminance signal Y has a pulse-like waveform during the vertical retrace interval, the time constant for the portion of AC coupling circuit 24 for coupling the luminance signal is chosen to be long enough to assure passage of an accurate representation of the AC component of the luminance signal Y during the chrominance reference portion of the VIR signal.

It is important to note that the B−Y color difference signal and the luminance signal introduced by AC coupling circuit 24 to control loop 22 are totally and completely independent of any DC bias introduced to the luminance or chrominance difference signals in the chrominance signal processing section 10. The AC coupled signals are therefore solely proportional to the value of the received chrominance and luminance signals and amplification of those signals by chroma signal processing section 10 and other sections of the receiver.

Since the B−Y color difference signal and luminance signal are transmitted in a fixed preselected ratio to one another during the chrominance reference portion of the VIR signal, the AC coupled color difference signal and AC coupled luminance signal within control loop 22 can be set to present a unique ratio to one another upon proper adjustment of the chroma gain of the receiver. For example, for a given color television receiver, with that receiver's unique amplification factors in both the chrominance and luminance amplification portions of the receiver and with that receiver's unique phosphorus content on the face of the cathode ray tube, an optimum saturation setting of the receiver results in the AC coupled B−Y color difference signal and the AC coupled luminance signal developing a ratio of "a" to "b" during the chrominance reference portion of the VIR signal. The magnitude "a" is illustrated in FIG. 2B as the absolute magnitude of the AC coupled B−Y signal from the quiescent AC zero level to the negative going step of the B−Y color difference signal during the chrominance reference portion of the VIR signal. The magnitude "b" is established by the peak of the AC coupled luminance signal Y during the chrominance reference portion of the VIR signal and any known reference level in the AC coupled luminance signal, for example, the blanking level or, as illustrated in FIG. 2C, the bottom of the horizontal synchronization pulse. The bottom of the horizontal synchronization pulse provides a suitable reference level since, in accordance with FCC regulations, the magnitude of the luminance signal from the bottom of the horizontal synchronization pulse to the blanking level is fixed by FCC regulations in the same manner as the magnitude from the blanking level to the peak of the chroma reference section of the VIR signal is established by FCC regulations.

Once the luminance signal Y is AC coupled in the control loop 22 by AC coupling circuit 24 there are a number of ways by which a DC reference point can be established in the luminance signal. For example, a clamping circuit may be employed in the portion of AC coupling circuit 24 for the luminance signal to clamp the bottom of the horizontal synchronization pulses of the AC coupled luminance signal to any arbitrarily selected DC value. As explained below with respect to FIG. 3, the value to which the AC coupled luminance signal is clamped is arbitrary, and the operation of control loop 22 is independent of any drift which may appear in that arbitrarily selected DC value.

Returning to FIG. 1, the AC coupled B−Y color difference signal illustrated in FIG. 2B and AC coupled luminance signal illustrated in FIG. 2C clamped to an arbitrary value are respectively coupled to first and second current amplifiers 28 and 30. Gating circuit 32 allows coupling of the AC B−Y signal to second current amplifier 30 only during a select portion of the VIR signal established by a timing pulse applied to terminal 44 of gating circuit 32. The timing of the pulse at terminal 44 has as its sole criteria that it enables at least a portion of the AC coupled B−Y signal to pass to current amplifier 30 during the chroma reference portion of the VIR signal.

Current amplifier 28 and 30 have arbitrary amplification factors dictated primarily by the operational parameters of matrix and error amplifier 34. The output of first current amplifier 30 represents the AC coupled B−Y signal and the output of second current amplifier 28 represents the AC coupled luminance signal Y. The outputs of current amplifier 28 and current amplifier 30 are combined in matrix and error amplifier 34 to result in an error signal proportional to the variations between the outputs of current amplifiers 28 and 30.

Accordingly, the amplified error signal from matrix amplifier 34 can be used to continuously adjust the gain of chrominance amplifier 12 and thereby adjust the comparative magnitudes of the chrominance signal and the luminance signal such that the AC coupled luminance and AC coupled B−Y color difference signal remain at a preselected ratio to one another during each single interrogation of the VIR signal dictated by a single VIR timing pulse at terminal 44 of gating circuit 32. The specific value of this ratio is determined by adjustment of the gain of current amplifiers 28 and 30 and/or in the alternative the circuit parameters of matrix amplifier 34. This ratio is set when the television receiver is assembled to establish a saturation level at the CRT representing the precise saturation level dictated by the VIR signal. Once the predetermined ratio is established, the saturation gain of the receiver is held to that ratio by continually updating the gain of chrominance signal amplifier 12 until the AC coupled luminance signal and the AC coupled B−Y color difference signal conform to the preselected ratio to one another during each single interrogation of the VIR signal.

The error signal from matrix amplifier 34 is applied to storage circuit 36 and the stored error signal in storage circuit 36 is coupled through manual VIR selection circuit 38 to control the gain of chrominance amplifier 12, as explained above.

In the embodiment of the present invention disclosed in FIG. 1, control loop 22 further includes the preference control circuit 26 illustrated as being positioned in the luminance signal input of AC coupling circuit 24. Preference control circuit 26 includes means for adjusting the level of at least one of the luminance signal and select color difference signal applied to AC coupling circuit 24 such that the error signal from secondary matrix amplifier 34 results in a shift in the comparative magnitudes of the signal from chrominance signal amplifier 12 and the luminance signal on terminal 20. This shift maintains the relative magnitudes of the AC coupled luminance and color difference signals as adjusted by the preference control circuit 26 in accordance with the preselected ratio heretofore described, thereby causing a shift in the saturation of the color picture of the television receiver. The degree of the shift is manually controlled by the viewer through the application of a preference control signal at terminal 46 of preference control circuit 26. A full and complete description of the operation and structure of preference control circuit 26 may be found in co-pending patent application, Ser. No. 726,182, Preference Control For VIR Automatic Operation, filed Sept. 24, 1976 by Robert Banker et al. and assigned to the assignee of the present invention.

Figure 3:
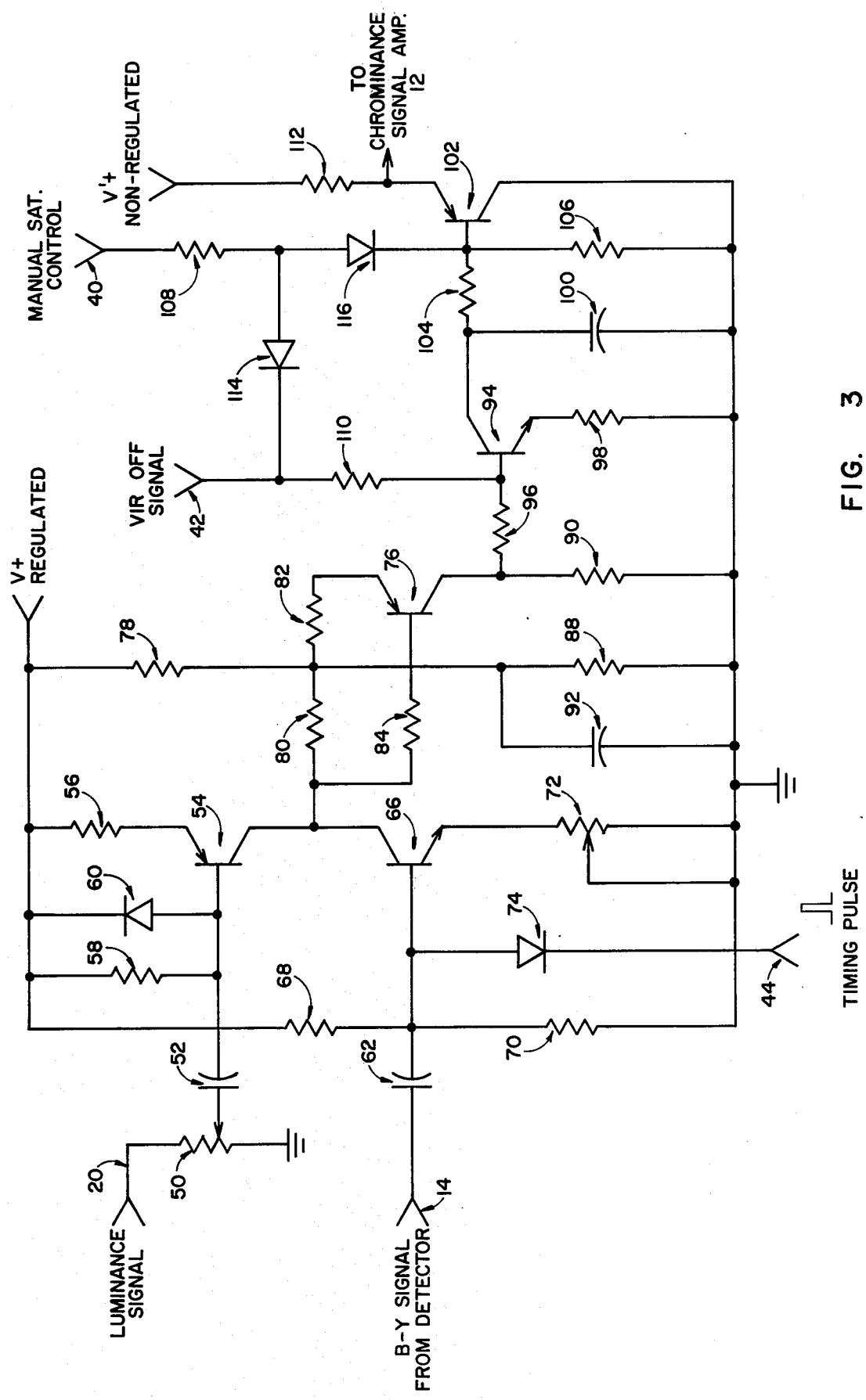
FIG. 3 is a circuit diagram of one embodiment of a portion of the automatic saturation control disclosed in FIG. 1.

Referring now to FIG. 3, there is shown a specific example of a portion of the automatic chroma gain control circuit shown in FIG. 1. In FIG. 3, a preference control circuit between luminance signal terminal 20 and the AC coupling circuit of the present invention is illustrated as comprising resistor 50. A variable tap point on resistor 50 couples the luminance signal to an AC coupling circuit comprising a capacitor 52. Capacitor 52 is, in turn, coupled to a first current amplifier comprising transistor 54 and biasing resistors 56 and 58. The base of transistor 54 is coupled directly to capacitor 52 whereas the emitter of transistor 54 is coupled through resistor 56 to a regulated voltage supply V. Further biasing is provided by the connection of resistor 58 between the base of transistor 54 and the regulated voltage source V. A clamping diode 60 is also coupled in parallel with resistor 58 between the base of transistor 54 and the regulated voltage supply V.

The B−Y color difference signal from detector 14 is AC coupled in the control loop of the present invention by an AC coupling circuit illustrated in FIG. 3 as capacitor 62. Capacitor 62 is, in turn, coupled to a second current amplifier comprising transistor 66 and biasing resistors 68, 70 and 72. The base of transistor 66 is coupled to capacitor 62. Resistor 68 is coupled between the regulated voltage supply V and the base of transistor 66, whereas resistor 70 is coupled between the base of transistor 66 and ground. Resistor 72 is coupled between the emitter of transistor 66 and ground.

A gating circuit comprising diode 74 is coupled between the base of transistor 66 and the terminal 44 for receipt of a single VIR timing pulse.

The collectors of transistor 54 and 66 are joined together at the input of a matrix and error amplifier comprising transistor 76, resistors 78, 80, 82, 84, 88 and 90 and capacitor 92. Specifically, the base of the transistor 76 is coupled to the junction of the collectors of transistors 54 and 66 by resistor 84. Resistor 78 is coupled between the junction of resistors 80 and 82 and the regulated voltage supply V, whereas resistor 88 is coupled between the junction of resistors 80 and 82 and ground. Capacitor 92 is coupled in parallel to resistor 88 and resistor 90 is coupled between the collector of transistor 76 and ground.

The output of the matrix amplifier, appearing at the collector of transistor 76, is coupled to a storage circuit comprising transistor 94, resistors 96 and 98 and capacitor 100. The base of transistor 94 is coupled to the collector of transistor 76 by resistor 96. The emitter of transistor 94 is coupled by resistor 98 to ground and the capacitor 100 is coupled between the collector of transistor 94 and ground.

The output of this storage circuit, appearing across capacitor 100, is coupled to chrominance signal amplifier 12 by a manual VIR selection circuit, comprising transistor 102, resistors 104, 106, 108, 110 and 112 and diodes 114 and 116. Specifically, the junction of the collector of transistor 94 and capacitor 100 is tied to the base of transistor 102 by resistor 104. The base of transistor 102 is also coupled to ground by resistor 106. The emitter of transistor 102 is coupled to a nonregulated voltage source V' by resistor 112.

A VIR OFF signal terminal 42 of the manual VIR selection circuit is coupled to the base of transistor 94 by resistor 110 and a manual saturation control terminal 40 of the manual VIR selection circuit is coupled to the base of transistor 102 by the series combination of resistor 108 and diode 116. Diode 114 is coupled between the junction of resistor 108 and diode 116 and the junction of terminal 42 and resistor 110. The output of the manual VIR selection circuit appears at the emitter of transistor 102 and is coupled to chrominance signal amplifier 12 of FIG. 1.

Before considering the operation of the embodiment of the present invention illustrated in FIG. 3, reference should again be made to FIG. 2. FIG. 2A illustrates the VIR signal as received. However, in the receiver for which the embodiment of FIG. 3 is intended, the VIR signal is inverted by video processing circuitry and accordingly the B−Y signal from detector 14 and the luminance signal at terminal 20 are likewise inverted from that shown. The operations of current amplifiers 54 and 66 reinvert the signals so that the signals appear as shown in FIGS. 2B and 2C at the collectors of these transistors.

In operation, a B−Y color difference signal such as from color difference detector 14 of FIG. 1 is applied to capacitor 62 of the closed loop video control circuit illustrated in FIG. 3. All DC components of the B−Y signal appearing at capacitor 62 are removed by capacitor 62 and only the AC component of the B−Y signal from color difference signal detector 14 is passed on to transistor 66. The time constant of the AC coupling circuit created by capacitor 62 is determined by the values of resistor 68 and 70 and the input impedance of transistor 66.

The luminance signal from the preference control circuit variable resistor 50 is AC coupled in the control circuit of the present invention by an AC coupling circuit comprising capacitor 52. The time constant of the AC coupling circuit is established by the resistance of resistor 58 and the input impedance of transistor 54. The AC coupled luminance signal is clamped to the regulated voltage supply V by diode 60. Accordingly, the input to the base of transistor 54 is determined by the magnitude by which the AC component of the luminance signal Y varies from the base of the horizontal synchronization pulses of the luminance signal as illustrated by the magnitude "b" in FIG. 2C. On the other hand, the input to the base of transistor 66 appears as the magnitude of the AC component of the B−Y color difference signal from detector 14 as illustrated by the magnitude "a" in FIG. 2B, again recognizing that the waveforms at the input of transistors 54 and 66 are inverted from that shown in FIGS. 2B and 2C.

The current path from transistor 54 to the matrix amplifier comprises resistor 56, the emitter-collector junction of transistor 54, resistor 80, and resistor 88. The current path for transistor 66 comprises resistor 78, resistor 80, the collector-emitter junction of transistor 66 and resistor 72. The gain of transistor 54 is therefore determined by and approximately equal to the ratio of resistor 80 to resistor 56, resistor 88 being bypassed by capacitor 92, and the gain of transistor 66 is determined by and approximately equal to the ratio of resistor 80 to resistor 72. The gain of transistor 66 can therefore be adjusted by adjustment of the pick-off point of resistor 72.

In a preferred operation of the present invention, the resistance of resistor 72 is chosen with respect to the resistance of resistor 80 in a manner which results in the current from transistor 66 approximately equaling the current from transistor 54 during the chrominance reference portion of the VIR signal when the chroma gain of the television receiver is properly adjusted to the preselected ratio of "a" to "b". Thus, when the AC component of the chrominance signal exceeds the preselected ratio to the AC coupled luminance signal, the collector current in transistor 66 exceeds the collector current in transistor 54 and a net current flow results in resistor 80 from the junction of resistors 78 and 88 to the common junction of the collectors of transistor 54 and 66. This current flow through resistor 80 creates a bias for the base of transistor 76, turning transistor 76 on and, in turn, activating transistor 94, thereby effectively placing resistor 99 across capacitor 100 to slowly discharge capacitor 100.

Emitter follower 102 follows the voltage across capacitor 100 and therefore adjusts the gain of chrominance amplifier 12 in a downward direction over a period of frames until the B−Y color difference signal from detector 14 is reduced in magnitude to a point where the resultant current flow of transistor 66 no longer exceeds the current flow in transistor 54 to the extent by which transistor 76 is turned on. When the current in transistor 66 is less than the current in transistor 54, transistors 76 and 94 are turned off, and capacitor 100 is allowed to slowly charge by the base current from transistor 102. As the charge on capacitor 100 builds, the gain of chrominance amplifier 12 is increased by the operation of emitter follow 102, until the ratio of the AC component of the B−Y signal exceeds the preselected ratio to the AC coupled luminance signal and transistor 94 is again turned on to discharge capacitor 100 in servo loop fashion.

In accordance with the present invention, transistor 66 is allowed to turn on only upon receipt of a single positive VI timing pulse at terminal 44 which reverse biases diode 74 and allows the AC coupled signal across capacitor 62 to appear at the base of transistor 66. The timing of the single VIR timing pulse appearing at terminal 44 is not critical except that it must include at least a portion of the chrominance reference portion of the VIR signal.

The fact that the time of the single VIR pulse is not critical can be seen from the following discussion. First, the timing pulse may extend beyond the chrominance reference portion of the VIR signal and into the luminance reference portion of the VIR signal because during the luminance reference portion of the VIR signal, the value of the AC component of the luminance signal necessarily exceeds the value of the AC portion of the B−Y color difference signal which during the luminance reference portion is non-existent. Accordingly, during the luminance reference portion of the VIR signal, even if diode 74 were reversed biased, the collector current of transistor 54 would necessarily exceed the collector current of transistor 66 creating a condition whereby transistor 76 is turned off preventing any error signal across resistor 90. This is the same condition as if diode 74 were forward biased. On the other hand, the start of the single VIR timing pulse at terminal 44 is restricted only in that it must occur after the horizontal synchronization pulse to provide accurate gating of the transistor 66. Ideally, the pulse should also occur after the color burst signal to avoid any adverse effect from a B−Y component of the burst signal.

Accordingly, the present invention employs a single interrogation of the VIR signal using a single VIR timing pulse to realize automatic saturation control for a color television receiver which timing pulse does not require critical placement during the course of the VIR signal.

It should also be noted that the VIR control circuit illustrated in FIG. 3 operates independently of DC drift. For example, drift in the V regulated supply might alter the operating point of transistor 54 and the source voltage available at the junction of resistors 78 and 80 for transistor 76, but the operation of transistor 76 in response to the relative collector currents in transistors 54 and 66 is unaffected by such drift until the V regulated supply falls to such an extent there is insufficient drive for transistors 54, 66 and 76. In a similar manner, operation of the circuit is independent of drift in the unregulated V voltage. Such drift might have a slight effect on the rate by which the base current of transistor 102 charges capacitor 100, but it has no effect on the point at which transistor 94 turns on to discharge capacitor 100. Thus, while, the period of servo operation of the control loop 22 might be affected by DC voltage drift, the equilibrum point of the circuit is unaffected.

Turning now to the manual VIR section of the circuit illustrated in FIG. 3, it may be seen that the appearance of a positive VIR OFF signal at terminal 42 turns transistor 94 ON which discharges capacitor 100 and renders capacitor 100 ineffective in controlling the operation of emitter-follower transistor 102. However, with transistor 94 biased continuously ON and capacitor 100 discharged, a signal appearing at manual saturation control terminal 40 across the voltage divider comprising resistors 108 and 106 creates a bias for the base of transistor 102 which controls the operation of transistor 102 and consequently controls the gain of chrominance signal amplifier 12. To prevent operation of transistor 102 by manual saturation control voltage in the absence of a VIR OFF signal, diode 114 acts to couple any manual saturation control voltage appearing at terminal 40 to ground through resistor 108, diode 114 and terminal 42.

I claim:

1. In a color television receiver for translating a luminance signal and a chrominance signal containing color difference signals into a color picture, an automatic saturation control circuit responsive to a VIR signal having a chrominance reference portion, said saturation control circuit comprising:
first matrix means responsive to said color difference signals and said luminance signal to provide color signals for the color picture tube of said television receiver;
a closed loop control circuit coupled to said luminance signal and to a selected one of said color difference signals, said closed loop control circuit including second matrix means, saturation control means and AC coupling means coupling only the AC information in said luminance signal and the AC information in said selected one color difference signal to said second matrix means;
said second matrix means comparing the AC information of said luminance signal and the AC information of said selected one color difference signal to develop an error signal during a single interrogation of said VIR signal;
said saturation control means being responsive to said error signal to continuously adjust the comparative magnitudes of said chrominance signal and said luminance signal such that said luminance signal and the selected one color difference signal conform to a preselected ratio.

2. The invention recited in claim 1 wherein said closed loop control circuit also includes gating means controlled by a single VIR timing pulse to establish said single interrogation of said VIR signal, the duration of said timing pulse including at least a portion of the chrominance reference portion of said VIR signal.

3. The invention recited in claim 2 wherein said closed loop control circuit also includes:
first amplifier means for generating a first current responsive to the AC information of said select one color difference signal;
second amplifier means for generating a second current responsive to the AC information of said luminance signal; and
said second matrix means generating said error signal responsive to said first and second currents.

4. The invention recited in claim 3 wherein said saturation control means includes:
storage means for developing and storing a DC control voltage in response to said error signal; and
means for continuously adjusting said comparative magnitudes of said chrominance signal and said luminance signal in response to said stored DC control voltage.

5. In a color television receiver, an automatic saturation control circuit responsive to a VIR signal having a chrominance reference portion, said saturation control circuit comprising:
means for providing a luminance signal,
means for providing color difference signals from a chrominance signal,
matrix means,
a closed control loop including said matrix means and means for AC coupling only the AC information in said luminance signal and only the AC information in one of said color difference signals to said matrix means,
said matrix means being responsive to any AC difference between said luminance signal and said one color difference signal to develop a control signal,
timing means included within said control loop for activating said control loop a single time during the presence of said VIR signal, and
means responsive to said control signal to adjust the chrominance to luminance ratio of said receiver in accordance with said VIR signal.

6. A saturation control circuit as recited in claim 5 wherein said timing means is responsive to a single timing pulse during the presence of said VIR signal, the duration of said timing pulse including at least a portion of the chrominance reference portion of said VIR signal.

7. The saturation control circuit recited in claim 6 further including second matrix means responsive to said luminance signal and said color difference signals to provide color signals for the color picture tube of said television receiver, and chrominance control means for adjusting the amplitude of said chrominance signal in response to said control signal.

* * * * *